(12) United States Patent
Olmeda Reino et al.

(10) Patent No.: US 11,170,226 B2
(45) Date of Patent: Nov. 9, 2021

(54) TRACKING OBJECTS IN SEQUENCES OF DIGITAL IMAGES

(71) Applicants: TOYOTA MOTOR EUROPE, Brussels (BE); MAX-PLANCK-GESELLSCHAFT ZUR FÖRDERUNG DER WISSENSCHAFTEN E.V., Munich (DE)

(72) Inventors: Daniel Olmeda Reino, Brussels (BE); Bernt Schiele, Saarbrücken (DE); Björn Andres, Heidelberg (DE); Mykhaylo Andriluka, Saarbrücken (DE); Siyu Tang, Tübingen (DE)

(73) Assignees: TOYOTA MOTOR EUROPE, Brussels (BE); MAX-PLANCK-GESELLSCHAFT ZUR FÖRDERUNG DER WISSENSCHAFTEN E.V., Munich (DE)

(*) Notice: Subject to any disclaimer, the term of this patent is extended or adjusted under 35 U.S.C. 154(b) by 19 days.

(21) Appl. No.: 16/628,614

(22) PCT Filed: Jul. 6, 2017

(86) PCT No.: PCT/EP2017/067037
§ 371 (c)(1),
(2) Date: Jan. 3, 2020

(87) PCT Pub. No.: WO2019/007524
PCT Pub. Date: Jan. 10, 2019

(65) Prior Publication Data
US 2020/0218904 A1    Jul. 9, 2020

(51) Int. Cl.
*G06K 9/00* (2006.01)
*G06K 9/62* (2006.01)

(52) U.S. Cl.
CPC ..... *G06K 9/00778* (2013.01); *G06K 9/00369* (2013.01); *G06K 9/6224* (2013.01)

(58) Field of Classification Search
CPC ........... G06K 9/00778; G06K 9/00369; G06K 9/6224
See application file for complete search history.

(56) References Cited

U.S. PATENT DOCUMENTS

| 2013/0058535 A1* | 3/2013 | Othmezouri | ......... G06K 9/6215 382/103 |
|---|---|---|---|
| 2013/0142390 A1* | 6/2013 | Othmezouri | ............ G06T 7/251 382/103 |

(Continued)

OTHER PUBLICATIONS

Iqbal, Umar et al., "Pose-Track: Joint Multi-Person Pose Estimation and Tracking"; arxiv.org, Cornell University Library, 201 Olin Library Cornell University, Ithaca, NY 14853, Nov. 23, 2016.

(Continued)

*Primary Examiner* — Fayyaz Alam
(74) *Attorney, Agent, or Firm* — Dinsmore & Shohl LLP (57) ABSTRACT

A system for tracking objects in a temporal sequence of digital images is configured to: detect potential objects in the images, the detected potential objects being indicated as nodes, identify pairs of neighboring nodes, such that for each pair the nodes of said pair potentially represent an identical object and their spatial and/or temporal relationship with each other is within a predetermined range, connect each pair of neighboring nodes with a first type edge, identify at least one supplementary pair of distant nodes whose spatial and/or temporal relationship with each other exceeds the predetermined range, connect the pair of distant nodes with a supplementary second type edge, each of the first and second type edges being assigned a cost value, and determine a track of an object in the temporal sequence of (Continued)

digital images based on a set of connected first type edges and at least one second type edge.

20 Claims, 2 Drawing Sheets

(56) References Cited

U.S. PATENT DOCUMENTS

2013/0271458 A1* 10/2013 Andriluka ............... G06T 7/55
                                                                               345/420
2015/0278633 A1* 10/2015 Yeh ................... G06K 9/00791
                                                                               382/103

OTHER PUBLICATIONS

Tang, Siyu et al, "Multi-Person Tracking by Multicut and Deep Matching"; arxiv.org, Cornelll University Library, 201 Olin Library Cornell University, Ithaca, NY 14853, Aug. 17, 2016, pp. 107.

Tang, Siyu, "Graph decomposition for multi-person tracking, pose estimation and motion segmentation"; Valse Online Vision and Learning Seminar, Aug. 31, 2016, URL: http://valser.org/article-167-1.html.

Keuper, Margret et al., "Motion Trajectory Segmentation via Minimum Cost Multicuts"; 2015 IEEE International Conference on Computer Vision (ICCV), IEEE, Dec. 7, 2015, pp. 3271-3279.

International Search Report for International Application No. PCT/EP2017/067037 dated Apr. 9, 2018.

* cited by examiner

TRACKING OBJECTS IN SEQUENCES OF DIGITAL IMAGES

CROSS-REFERENCE TO RELATED APPLICATIONS

This application is a National Phase Application of International Application No. PCT/EP2017/067037, filed on Jul. 6, 2017. The entire disclosure of the above application is incorporated herein by reference.

FIELD OF THE DISCLOSURE

The present disclosure is related to a system and a method for tracking objects in a temporal sequence of digital images, in particular for detecting and tracking humans in a digital video stream.

BACKGROUND OF THE DISCLOSURE

Tracking multiple persons in a monocular video of a crowded scene is a challenging task. Humans can master it even if they lose track of a person locally by re-identifying the same person based on their appearance. Care must be taken across long distances, as similar-looking persons need not be identical.

Anyway, multiple people tracking has improved considerably in the last years. One trend in this area of research has been to develop CNN-based feature representations for people appearance to effectively model relations between detection hypotheses, cf. e.g.:

C. Kim, F. Li, A. Ciptadi, and J. M. Rehg. Multiple hypothesis tracking revisited. In Computer Vision (ICCV), IEEE International Conference on. IEEE, December 2015

This trend has two advantages: Firstly, representations of people appearance can be learned for varying camera position and motion, a goal less easy to achieve with simple motion models, especially for monocular video due to the complexity of motion under perspective projection. Secondly, appearance facilitates the re-identification of people across long distances, unlike motion models that become asymptotically uncorrelated.

Yet, incorporating long-range re-identification into algorithms for multiple people tracking remains challenging. One reason, as already noted, is the simple fact that similar looking people are not necessarily identical.

Recent works on multi-person tracking focus on the tracking-by-detection approach, cf. e.g.:

A. Milan, S. Roth, and K. Schindler. Continuous energy minimization for multitarget tracking. IEEE TPAMI, 2014.

Tracking may be performed either directly on people detections, or on a set of confident tracklets, which are obtained by first grouping detections. Introducing tracklets can reduce the state space; however, such approaches need a separate tracklet generation step, and any mistakes introduced by the tracklet generation are likely to be propagated to the final solution.

One common formulation for multi-person tracking are network flow-based methods, cf. e.g.:

H. Pirsiavash, D. Ramanan, and C. C. Fowlkes. Globallyoptimal greedy algorithms for tracking a variable number of objects. In CVPR, 2011.

Such methods formulate tracking as a graph-based optimization problem.

Recently, minimum cost multicut formulation has been proposed to address the multi person tracking problem, cf. e.g.:

S. Tang, B. Andres, M. Andriluka, and B. Schiele. Multiperson tracking by multicuts and deep matching. In BMTT, 2016.

Here, it is proposed to model the tracking problem as a correlation clustering problem where detection hypotheses are jointly clustered over space and time. The optimal number of people as well as the cluster of each person are obtained by partitioning the graph with attractive and repulsive terms.

Recently, it has been further proposed to model the similarity between pairs of detections by CNNs, cf. e.g.:

L. Leal-Taixe, C. Canton-Ferrer, and K. Schindler. Learning by tracking: Siamese CNN for robust target association. arXiv:1604.07866.

Several architectures have been explored and they present findings that forming a stacked input to CNNs performs the best.

SUMMARY OF THE DISCLOSURE

Currently, it remains desirable to provide a system and method for reliably tracking an object in a temporal sequence of digital images, in particular across long distances and without confusing similar-looking objects.

Therefore, according to the embodiments of the present disclosure, it is provided a system for tracking objects in a temporal sequence of digital images. The system is configured to: detect potential objects in the images, the detected potential objects being indicated as nodes, identify pairs of neighboring nodes, such that for each pair the nodes of said pair potentially represent an identical object and their spatial and/or temporal relationship with each other is within a predetermined range, connect each pair of neighboring nodes with a first type edge, identify at least one supplementary pair of distant nodes whose spatial and/or temporal relationship with each other exceeds the predetermined range, connect the pair of distant nodes with a supplementary second type edge, each of the first and second type edges being assigned a cost value representing a probability whether the connected nodes represent an identical object or not, and determine a track of an object in the temporal sequence of digital images based on a set of connected first type edges and at least one second type edge additionally connecting at least one of the nodes connected by the set of connected first type edges.

The system may comprise an electronic unit configured to perform the above described system functions.

An object (e.g. a human) may be detected in several images so that the resulting nodes have a temporal offset and eventually also a spatial offset to each other. However, the same object may be detected in one image several times, resulting in several nodes having a spatial offset but no temporal offset to each other. For this reason, edges may also connect nodes located in the same image or on different images. Hence, the relationship of connected nodes may be a spatial and/or a temporal relationship to each other.

The identified pairs of neighboring nodes, which are each connected by a first type edge, fulfill two conditions: The nodes of a pair potentially represent an identical (i.e. the same) object. Hence, a basic element of a track of an object may be determined by such a first type edge. In addition, the spatial and/or temporal relationship of the connected neighboring nodes is within a predetermined range. Hence, the neighboring nodes are relatively "close" to each other, this may mean e.g. their combined temporal and spatial distance to each other does not exceed a predetermined distance, or e.g. no further node (representing the same object) has been identified which is between the two neighboring nodes (e.g. within the spatial and/or temporal extension of the edge).

Each edge desirably has a cost value which indicates whether the connected nodes probably represent the same object or not. Accordingly, the cost value of a first type edge desirably indicates that the connected nodes represent the same object, e.g. might be above a predetermined threshold.

The system is desirably further able to basically determine the track of an object (e.g. a human) by identifying a set (e.g. a chain) of first type edges, wherein the track is verified and eventually updated based on the at least one second type edge.

The nodes, which have been connected by the set of first type edges, desirably represent the tracked object. Hence, this set may initially define the track. Anyhow said track is still verified (and eventually updated) based on the at least one second type edge, in particular based on its cost value. For example, a cost value of the second type edge above a predetermined upper threshold indicating that the distant nodes represent the identical object (and in particular also the object represented by the set of first type edges) may confirm the initial track or even lead to a joining of further first type edges to the initial track. In another example, a cost value below a predetermined lower threshold indicating that the distant nodes represent different objects may lead to a cutting of the initial track into several tracks.

It is also possible that the first type edges (an eventually also the at least one second type edge) may be assigned initially a cost value, e.g. to determine the initial track based on the identified set of connected first type edges. In this case the function of verifying and updating the track may comprise a verification and updating of the cost values of the first type edges (an eventually also the at least one second type edge). Based on the updated cost values the track may be updated.

In general, according to the present disclosure, the mathematical model of e.g.: S. Tang, B. Andres, M. Andriluka, and B. Schiele. Subgraph decomposition for multi-target tracking. In CVPR, 2015 is desirably generalized, in order to avoid confusing similar looking but in fact different objects. Thereby the mathematical model is desirably generalized so as to express the fact that similar looking people are considered as the same person only if they are connected by at least one feasible track (possibly skipping occlusion). In the above-mentions prior art, multi-person tracking is cast as a minimum cost multicut problem. There and in the present disclosure, every detection (i.e. detected object) is represented by a node in a graph; edges connect detections within and across time frames, and costs assigned to edges can be positive, to encourage the incident nodes to be in the same track, or negative, to encourage the incident nodes to be in distinct tracks. Such mathematical abstraction has several advantages:

Firstly, the number of persons is not fixed or biased by definition of the problem, but is estimated in an unbiased fashion from the video sequence and is determined by the solution of the problem. Secondly, multiple detections of the same person in the same frame are effectively clustered, which eliminates the need for heuristic non-maxima suppression. In order to avoid that distinct but similar looking people are assigned to the same track, a distinction must be made between edges that define possible connections (i.e., a feasible set) and edges that define the costs or rewards for assigning the incident nodes to distinct tracks (i.e., an objective function). This can be achieved, by casting the multi-person tracking problem as a minimum cost lifted multicut problem, as explain in the following. Specifically, three contributions may be made:

Firstly, deep networks for reidentifying persons may be designed and trained by fusing human pose information. This provides a mechanism for associating person hypotheses that are temporally distant and allows to obtain correspondence before and after occlusion.

Secondly, a novel formulation of multi-person tracking is proposed as the minimum cost lifted multicut problem. Two types of edges (regular, i.e. first type, and lifted, i.e. second type edges) are desirably introduced into the graph.

The regular edges define the set of feasible solutions in the graph, namely, which pair of nodes can be joint/cut. The lifted edges add additional long range information to the objective on which nodes should be joint/cut without modifying the set of feasible solutions. Such a formulation encodes long-range information, yet penalizes long-term false joints (e.g., similar looking people) by forcing valid paths in the feasible solution in a unified and rigorous manner.

Thirdly, it can be shown that tracks defined by local optima of this optimization problem define a new state-of-the-art, e.g. for the MOT16 benchmark.

Accordingly, the present disclosure differs from the previous multicut based work form the prior art by introducing additional edges (i.e. second type edges) in a graph to incorporate long-range information into the tracking.

Furthermore, as the detections are desirably clustered jointly in space and time, the system is able to handle multiple detection hypotheses of the same target on each frame.

The at least one supplementary pair of distant nodes may be identified such that the nodes of said supplementary pair potentially represents an identical object, or such that the nodes of said supplementary pair potentially represent different objects.

Accordingly, different types of second type edges (in particular with different cost values) may be used to verify the track, e.g. in the first alternative to confirm a set of first type edges as a track, in the second to confirm that a track has to be cut.

The system may comprise a neural network being configured to assign each of the first and second type edges a cost value representing a probability whether the connected nodes represent an identical object or not.

Accordingly, the above described function of the system of assigning cost values may be performed by a neural network.

The neural network is desirably a convolutional neural network (CNN).

The neural network (or a further neural network) may be configured to: detect the potential objects in the images, the detected potential objects being indicated as nodes, identify the pairs of neighboring nodes, connect each pair of neighboring nodes, identify the at least one supplementary pair of distant nodes, and connect the pair of distant nodes.

Accordingly, the above described functions of the system may also be performed by a neural network.

The function of determining the track may comprise: identifying a set of connected first type edges representing the track, and update the track based on the at least one second type edge.

In particular, a track may be a component of a graph which is determined by the system. In this case determining a track may comprise: determining a graph having a plurality of components, wherein each component comprises a set of connected first type edges, and updating the graph by joining and/or cutting single components based on at least one supplementary second type edge, wherein each joined and/or cut component of the updated graph represents a track of an object.

The system may be further configured to: update the graph by joining single components to a merged component, in case at least one supplementary second type edge extends along said single components.

This may be in particular true, when the cost value of said second type edge rewards the joining.

Accordingly, the system may be further configured to: update the graph by joining single components to the merged component, only in case the cost value of said at least one supplementary second type edge exceeds a predetermined threshold value.

Said cost value desirably represents a predetermined minimum probability that the connected distant nodes represent an identical object.

The system may be further configured to: connect a pair of distant nodes with a second type edge, only in case said distant nodes are also connected by a set of connected first type edges.

Accordingly, identifying a second type edge may comprise comprises identifying before a set of connected first type edges. Said set of connected first type edges desirably represents the same object as the second type edge.

The spatial and/or temporal relationship of a pair of nodes may be defined by the spatial and/or temporal distance of said pair of nodes to each other, and/or the predetermined range is defined by a predetermined spatial and/or temporal distance threshold.

The predetermined range may be defined such that the spatial and/or temporal relationship of a pair of nodes exceeds the predetermined range, in case at least one further node is identified between the pair of nodes potentially representing the identical object like said pair of nodes.

The determination that nodes potentially represent an identical object may be based on the cost value of the connecting edge.

The cost value of an edge may be determined based on the scales, coordinates and/or appearances of the connected nodes.

The present disclosure further relates to a method of tracking objects in a temporal sequence of digital images, comprising the steps of: detecting potential objects in the images, the detected potential objects being indicated as nodes, identifying pairs of neighboring nodes, such that for each pair the nodes of said pair potentially represent an identical object and their spatial and/or temporal relationship with each other is within a predetermined range, connecting each pair of neighboring nodes with a first type edge, identifying at least one supplementary pair of distant nodes whose spatial and/or temporal relationship with each other exceeds the predetermined range, connecting the pair of distant nodes with a supplementary second type edge, each of the first and second type edges being assigned a cost value representing a probability whether the connected nodes represent an identical object or not, and determining a track of an object in the temporal sequence of digital images based on a set of connected first type edges and at least one second type edge additionally connecting at least one of the nodes connected by the set of connected first type edges.

The method may comprise further method steps which correspond to the functions of the system, as described above. The further method steps may be, as described below.

The at least one supplementary pair of distant nodes may be identified such that the nodes of said supplementary pair potentially represents an identical object, or such that the nodes of said supplementary pair potentially represent different objects.

The method may at least partially be performed by a neural network being configured to assign each of the first and second type edges a cost value representing a probability whether the connected nodes represent an identical object or not.

The neural network (or a further neural network) may perform also the following steps of the method: detect the potential objects in the images, the detected potential objects being indicated as nodes, identify the pairs of neighboring nodes, connect each pair of neighboring nodes, identify the at least one supplementary pair of distant nodes, and connect the pair of distant nodes.

The step of determining the track may comprise: identifying a set of connected first type edges representing the track, and update the track based on the at least one second type edge.

In particular a track may be a component of a graph which is determined by the system. In this case determining a track may comprise: determining a graph having a plurality of components, wherein each component comprises a set of connected first type edges, and updating the graph by joining and/or cutting single components based on at least one supplementary second type edge, wherein each joined and/or cut component of the updated graph represents a track of an object.

In a further step the method may update the graph by joining single components to a merged component, in case at least one supplementary second type edge extends along said single components.

Said cost value desirably represents a probability that the connected distant nodes represent an identical object.

In a further step the method may connect a pair of distant nodes with a second type edge, only in case said distant nodes are also connected by a set of connected first type edges.

The spatial and/or temporal relationship of a pair of nodes may be defined by the spatial and/or temporal distance of said pair of nodes to each other, and/or the predetermined range is defined by a predetermined spatial and/or temporal distance threshold.

The predetermined range may be defined such that the spatial and/or temporal relationship of a pair of nodes exceeds the predetermined range, in case at least one further node is identified between the pair of nodes potentially representing the identical object like said pair of nodes.

The determination that nodes potentially represent an identical object may be based on the cost value of the connecting edge.

The present disclosure further relates to a computer program comprising instructions for executing the steps of the method, when the program is executed by a computer.

It is intended that combinations of the above-described elements and those within the specification may be made, except where otherwise contradictory.

It is to be understood that both the foregoing general description and the following detailed description are exemplary and explanatory only and are not restrictive of the disclosure, as claimed.

The accompanying drawings, which are incorporated in and constitute a part of this specification, illustrate embodiments of the disclosure and together with the description, and serve to explain the principles thereof.

DESCRIPTION OF THE EMBODIMENTS

Reference will now be made in detail to exemplary embodiments of the disclosure, examples of which are illustrated in the accompanying drawings. Wherever possible, the same reference numbers will be used throughout the drawings to refer to the same or like parts.

Figure 1:
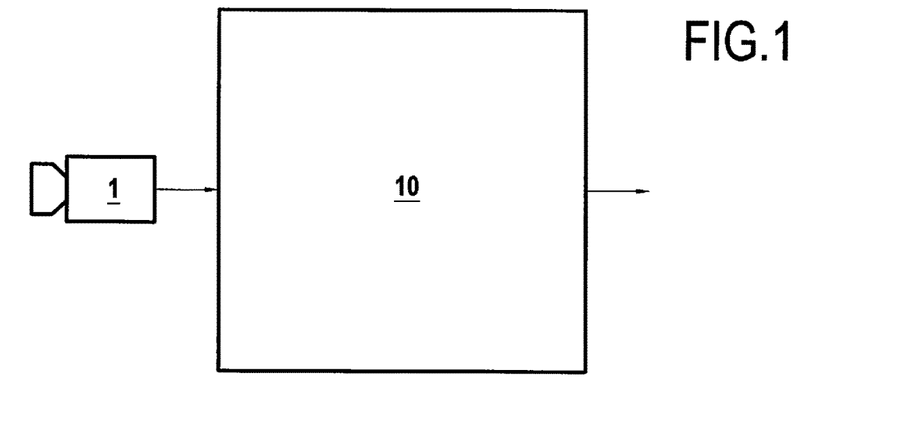
FIG. 1 shows a schematic block diagram of a system according to embodiments of the present disclosure.

FIG. 1 shows a block diagram of a system 10 according to embodiments of the present disclosure. The system may have various further functions, e.g. may be a robotic system or a camera system. It may further be integrated in a vehicle.

The system 10 may comprise an electronic circuit, a processor (shared, dedicated, or group), a combinational logic circuit, a memory that executes one or more software programs, and/or other suitable components that provide the described functionality. In other words, system 10 may be a computer device.

The system may be connected to a memory, which may store data, e.g. a computer program which when executed, carries out the method according to the present disclosure. In particular, the system or the memory may store software which may comprise a neural network according to the present disclosure.

The system 10 has an input for receiving digital images or a stream of digital images. In particular, the system 10 may be connected to an optical sensor 1, in particular a digital camera. The digital camera 1 is configured such that it can record a scene, and in particular output digital data to the system 10.

The system may be configured to identify objects in the images, e.g. by carrying out a computer vision algorithm for detecting the presence and location of objects in a sensed scene. For example, persons, vehicles and other objects may be detected. The system may track the detected objects across the images.

In the following the operation of the neural network according to the present disclosure is explained in more detail with reference to the mathematical abstraction of multiple people tracking as a minimum cost lifted multicut problem (LMP) according to the present disclosure.

The LMP is an optimization problem whose feasible solutions can be identified with decompositions of a graph. Comparing to the minimum cost multicut problem (MP), as known e.g. from: S. Tang, B. Andres, M. Andriluka, and B. Schiele. Multiperson tracking by multicuts and deep matching. In BMTT, 2016, which is defined with regard to a graph whose edges define possibilities of joining nodes directly into the same track. The LMP is defined, in addition, with regard to additional lifted edges (i.e. second type edges) that do not define possibilities of directly joining nodes. The decision of joining the nodes needs to be supported by the regular edges (i.e. first type edges).

The motivation for modeling the lifted edges comes from the simple fact that persons of similar appearance are not necessarily identical. Given two detections that are far apart in time and similar in appearance, it is more likely a priori that they represent the same person. At the same time, this decision is desirably certified a posteriori by a track connecting the two. This can be achieved by introducing the two classes of edges: In order to assign two detections that are far apart in time and similar in appearance to the same cluster (i.e. person), there must exist a path (i.e. track) along the regular edges, that certifies this decision.

Figure 2A:
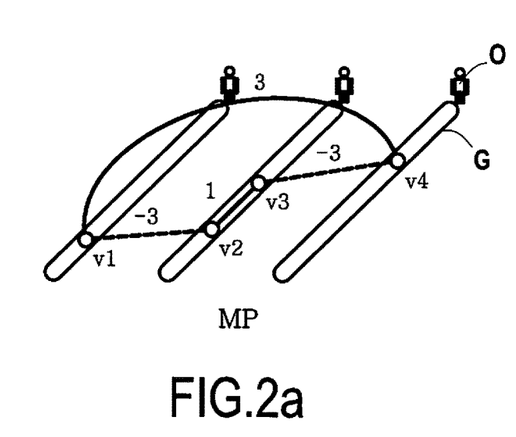
FIG. 2a shows a comparison of exemplary tracks according to the prior art.
Figure 2B:
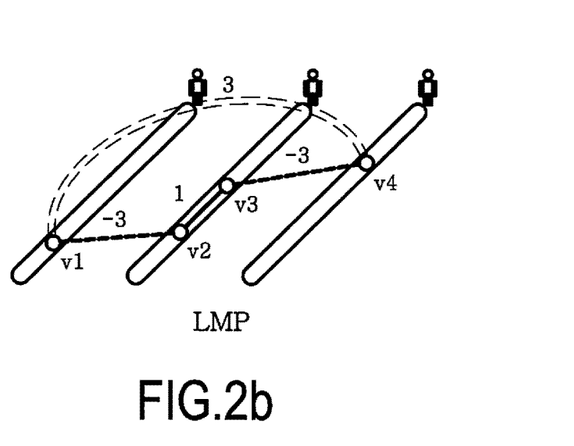
FIG. 2b shows a comparison of exemplary tracks according to embodiments of the present disclosure.
Figure 2C:
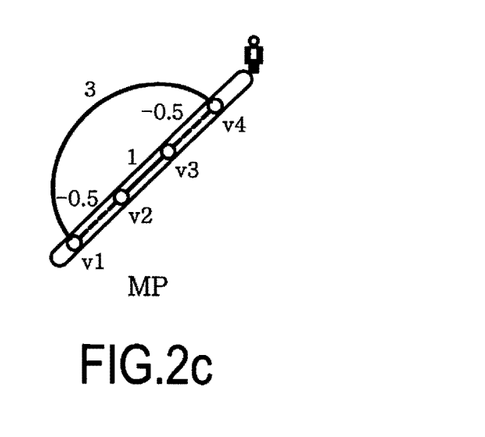
FIG. 2c shows a comparison of exemplary tracks according to the prior art.
Figure 2D:
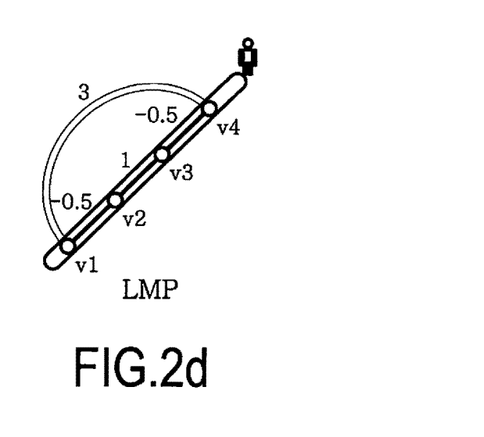
FIG. 2d shows a comparison of exemplary tracks according to embodiments of the present disclosure.

FIGS. 2a to 2d show comparisons of exemplary tracks according to the prior art (FIGS. 2a and 2c) and according to embodiments of the present disclosure (FIGS. 2b and 2d). In particular, a comparison between conventional Multicut Problem (MP) (FIGS. 2a and 2c) and Lifted Multicut Problem (LMP) (FIGS. 2b and 2d) is provided. Ground truth tracks G of each person O are depicted as hollow lines. Regular edges are depicted as simple lines, lifted edges as double lines. Solid lines indicate joints, dotted lines indicate cuts. Costs of cutting edges are indicated by the numbers on the corresponding edges.

In FIGS. 2a and 2b the same scene is processed, where three persons are in the scene, v1 is the detection (i.e. node) on the first person, v2 and v3 are the detections on the second, v4 is on the third. The costs on the edges v1v2 and v3v4 are −3, suggesting strong rewards towards cutting the edges, and this is correct (cf. ground truth). However, the cost on the edge v1v4 suggests that the first and the third person look similar and introduces a strong reward towards connecting them. As a result, the MP incorrectly connects v1 and v4 as the same person; the LMP according to the present disclosure does not connect v1 and v4, as such long-range join is not supported by the local edges.

FIG. 2c and FIG. 2d is another example, where the same scene is processed once by MP and once by LMP. In the scene all the detections are on the same person, namely, a track that connects all the nodes in the graph is desirable. Due to partial occlusion or inaccurate bounding box localization, the costs on the local edges v1v2 and v3v4 could be ambiguous, sometimes even reverse. The longrange edge v1v4 correctly re-identifies the person. The MP, however, produces two clusters for a single person because the long-range edge does not have influence on the local connections. In contrast, the LMP allows us to influence an entire chain of connections between person hypotheses with a single confident long-range observation.

Parameters:

Given an image sequence, it may be considered an instance of the LMP with respect to:

A finite set V in which every element represents a detection of one person in one image. For every detection, also its scale and the coordinates (x, y, t) of its center in the image sequence may be defined.

For every pair v,w of a node v and a node w: a conditional probability of v and w to represent distinct persons, given their scales, coordinates and appearance.

A graph whose edges are regular edges that connect detections v;w in the same image and also connect detections in distinct images that are close in time.

A graph whose additional edges are lifted edges which connect detections that are far apart in time and similar in appearance.

Feasible Set:

The feasible solutions of the LMP can desirably be identified with the decompositions (clusterings, i.e. components) of the graph G. Here, in the context of tracking, every component (i.e. cluster) of detections defines a track of one person. It is therefore reasonable to think of our approach as tracking by clustering. Formally, any feasible solution of the LMP may be a 01-vector.

Figures 3A, 3B:
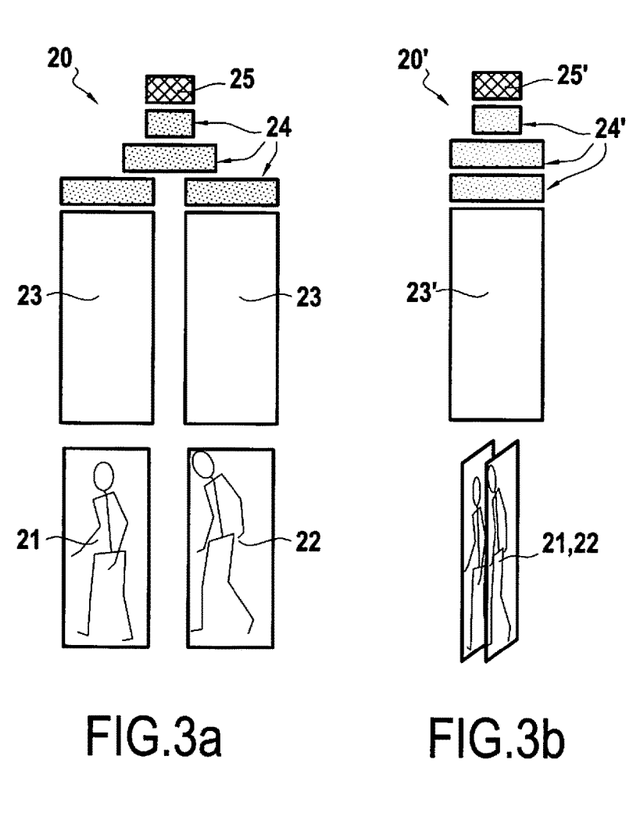
FIG. 3a shows a schematic representation of neural networks according to embodiments of the present disclosure.
FIG. 3b shows a schematic representation of neural networks according to embodiments of the present disclosure.
Figure 3C:
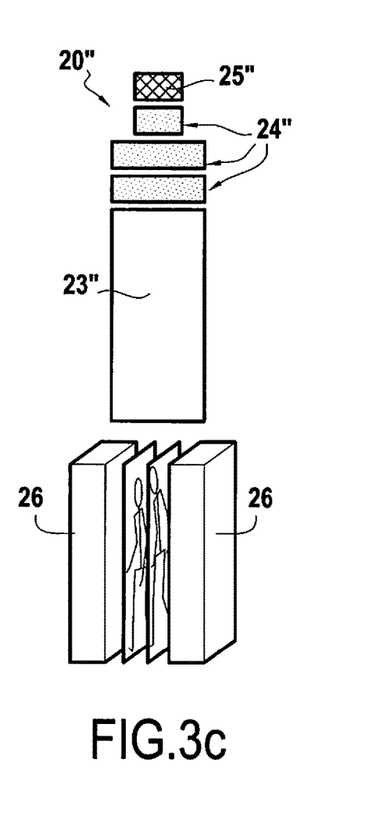
FIG. 3c shows a schematic representation of neural networks according to embodiments of the present disclosure.

FIGS. 3a to 3c show schematic representations of neural networks according to embodiments of the present disclosure. In particular, FIG. 3a shows a SiameseNet 20, FIG. 3b shows a StackNet 20", and FIG. 3c shows a StackNetPose 20'". Rectangles 23, 23', 23" indicate the convolutional, relu and pooling layers of VGG16. Rectangles 24, 24', 24" indicate the fully-connected layers. Rectangles 25, 25', 25" on the top of each network are the loss layers. Boxes 26 are the stacked body part score maps.

Traditionally, person re-identification is the task to associate observed pedestrians in non-overlapping camera views. In the context of multi-person tracking, linking the detected pedestrians across the whole video can be viewed as reidentification with special challenges: occlusions, cluttered background, large difference in image resolution and inaccurate bounding box localization. As described in the following, several CNN architectures may be used for re-identification for the multi-person tracking task. A basic CNN architecture may be VGG-16 Net, as described e.g. in:

K. Simonyan and A. Zisserman. Very deep convolutional networks for large-scale image recognition. CoRR, abs/1409.1556, 2014.

Particularly, a novel person re-identification model is proposed that combines the body pose layout obtained with state-of-the-art pose estimation methods.

ID-Net:

First a VGG net is learnt to recognize e.g. N=2511 unique identities from our data collection as an N-way classification problem. The VGG estimates the probability of each image being each label by a forward pass. The network is trained by the softmax loss. During testing, given an image from unseen identities, the final softmax layer is removed and the output of the fully-connected layer is used as the identity feature. Given a pair of images, the Euclidean distance between the two identity features can be used to decide whether the pair contains the same identity.

SiameseNet:

Siamese architecture means the network contains two symmetry CNNs which share the parameters. It may be started with a commonly used Siamese architecture as shown in FIG. 3(a). To model the similarity fully connected layers may be used on top of the twin CNNs. More specifically, the features FC6(xi); FC6(xj) from a pair of images are extracted from the first fully-connected layer of the VGG-based Siamese network that shares the weights. Then the features are concatenated and transformed by two fully-connected layers (FC7; FC8), where FC7 are followed by a ReLU non-linearity. FC8 uses a softmax function to produce a probability estimation over a binary decision, namely the same identity or different identities.

StackNet:

The most effective architecture which has been explored is the StackNet, where a pair of images are stacked together along the RGB channel. According to an example, the input to the network becomes 112×224×6. Then the filter size of the first convolutional layer is changed from 3×3×3 to 3×3×6, and for the rest of the network the VGG architecture may be followed. The last fully-connected layer models a 2-way classification problem, namely the same identity or different identities. During testing, given a pair of images, both SiameseNet and StackNet produce the probability of the pair being the same/different identities by a forward pass.

The StackNet allows a pair of images to communicate at the early stage of the network, but it is still limited by the lack of ability to incorporate body part correspondence between the images. Hence, as further embodiment a body part fusing method is proposed to explicitly allow modeling the semantic body part information within the network.

StackNetPose:

A desirable property of the network is to localize the corresponding regions of the body parts, and to reason about the similarity of a pair of pedestrian images based on localized body regions as well as the full images. Such a model may be implemented by fusing body part detections into the CNN. More specifically, body part detectors may be used to produce individual score maps for 14 body parts, namely, head, shoulders, elbows, wrists, hips, knees, and ankles, each with left/right symmetry body parts except the head which is indicated by head top and head bottom. The score maps from every two symmetry body parts are combined which results in 7 scores maps; each has the same size as the input image. The pair of images as well as the 14 score maps may be stacked together to form a 112×224×20 input volume. Now the filter size of the first convolutional layer is set as 3×3×20, and the rest of the network follows the VGG16 architecture with a 2-way classification layer in the end.

Pairwise Potentials:

The cost of an edge may be based on three information sources: spatio-temporal relations (ST), dense correspondence matching (DM) and person re-identification confidence (Re-ID).

The spatio-temporal relation based feature is commonly used in many multi-person tracking works, as it is a good affinity measure for pairs of detections that are in close proximity. ST features are able to provide useful information within a short temporal window. They model the geometric relations between bounding boxes but do not take image content into account.

DeepMatching (DM) may be introduced as a powerful pairwise affinity for multi-person tracking. The DM feature is based on local image patch matching, which makes it robust to irregular camera motion and to partial occlusion in short temporal distance. The performance of the DM feature drops dramatically when increasing temporal distance. Re-ID is explicitly trained for the task of person re-identification. It is robust with respect to large temporal and spatial distance and allows long-range association. Desirably, deep reidentification model (StackNetPose) may be used for modeling the longrange connections.

Throughout the description, including the claims, the term "comprising a" should be understood as being synonymous with "comprising at least one" unless otherwise stated. In addition, any range set forth in the description, including the claims should be understood as including its end value(s) unless otherwise stated. Specific values for described elements should be understood to be within accepted manufacturing or industry tolerances known to one of skill in the art, and any use of the terms "substantially" and/or "approximately" and/or "generally" should be understood to mean falling within such accepted tolerances.

Although the present disclosure herein has been described with reference to particular embodiments, it is to be understood that these embodiments are merely illustrative of the principles and applications of the present disclosure.

It is intended that the specification and examples be considered as exemplary only, with a true scope of the disclosure being indicated by the following claims.

The invention claimed is:

1. A system for tracking objects in a temporal sequence of digital images, the system being configured to:
    detect potential objects in the images, the detected potential objects being indicated as nodes,
    identify pairs of neighboring nodes, such that for each pair the nodes of said pair potentially represent an identical object and their spatial and/or temporal relationship with each other is within a predetermined range,
    connect each pair of neighboring nodes with a first type edge,
    identify at least one supplementary pair of distant nodes whose spatial and/or temporal relationship with each other exceeds the predetermined range,
    connect the pair of distant nodes with a supplementary second type edge,
    each of the first and second type edges being assigned a cost value representing a probability whether the connected nodes represent an identical object or not, and
    determine a track of an object in the temporal sequence of digital images based on a set of connected first type edges and at least one second type edge additionally connecting at least one of the nodes connected by the set of connected first type edges.

2. The system according to claim 1, wherein
    the at least one supplementary pair of distant nodes is identified such that the nodes of said supplementary pair potentially represents an identical object, or
    such that the nodes of said supplementary pair potentially represent different objects.

3. The system according to claim 1, wherein
    the track is determined based on the cost values of the set of connected first type edges and/or the cost value of the at least one supplementary second type edge.

4. The system according to claim 1, comprising a neural network being configured to:
    assign each of the first and second type edges a cost value representing a probability whether the connected nodes represent an identical object or not.

5. The system according to claim 4, wherein
    the neural network is further configured to:
    detect the potential objects in the images, the detected potential objects being indicated as nodes,
    identify the pairs of neighboring nodes,
    connect each pair of neighboring nodes,
    identify the at least one supplementary pair of distant nodes, and
    connect the pair of distant nodes.

6. The system according to claim 1, wherein
    determining the track comprises:
    identifying a set of connected first type edges representing the track, and
    updating the track based on the at least one second type edge.

7. The system according to claim 1, wherein
    determining a track comprises:
    determining a graph having a plurality of components, wherein each component comprises a set of connected first type edges, and
    updating the graph by joining and/or cutting single components based on at least one supplementary second type edge, wherein each joined and/or cut component of the updated graph represents a track of an object.

8. The system according to claim 7,
    further configured to:
    update the graph by joining single components to a merged component, in case at least one supplementary second type edge extends along said single components.

9. The system according to claim 7,
    further configured to:
    update the graph by joining single components to the merged component, only in case the cost value of said at least one supplementary second type edge exceeds a predetermined threshold value.

10. The system according to claim 1, further configured to:
    connect a pair of distant nodes with a second type edge, only in case said distant nodes are also connected by a set of connected first type edges.

11. The system according to claim 1, wherein
    the spatial and/or temporal relationship of a pair of nodes is defined by the spatial and/or temporal distance of said pair of nodes to each other, and/or
    the predetermined range is defined by a predetermined spatial and/or temporal distance threshold.

12. The system according to claim 1, wherein the predetermined range is defined such that the spatial and/or temporal relationship of a pair of nodes exceeds the predetermined range, in case at least one further node is identified between the pair of nodes potentially representing the identical object like said pair of nodes.

13. The system according to claim 1, wherein
    the determination that nodes potentially represent an identical object is based on the cost value of the connecting edge, and/or
    the cost value of an edge is determined based on the scales, coordinates and/or appearances of the connected nodes.

14. A method of tracking objects in a temporal sequence of digital images, comprising the steps of:
    detecting potential objects in the images, the detected potential objects being indicated as nodes,
    identifying pairs of neighboring nodes, such that for each pair the nodes of said pair potentially represent an identical object and their spatial and/or temporal relationship with each other is within a predetermined range,
    connecting each pair of neighboring nodes with a first type edge,
    identifying at least one supplementary pair of distant nodes whose spatial and/or temporal relationship with each other exceeds the predetermined range,
    connecting the pair of distant nodes with a supplementary second type edge, each of the first and second type edges being assigned a cost value representing a probability whether the connected nodes represent an identical object or not, and
    determining a track of an object in the temporal sequence of digital images based on a set of connected first type edges and at least one second type edge additionally connecting at least one of the nodes connected by the set of connected first type edges.

15. A non-transitory computer readable medium including a computer program comprising instructions for executing the steps of the method according to claim 14 when the program is executed by a computer.

16. The system according to claim 1, wherein the set of connected first type edges define a feasible solution in the graph, and the at least one second type edge adds additional long range information to an objective on which nodes should be joint or cut without modifying the feasible solution.

17. The system according to claim 1, wherein the first type edges define possibilities of joining nodes directly into the same track and the second type edges do not define possibilities of directly joining nodes.

18. The method according to claim 14, wherein determining the track comprises:
   identifying a set of connected first type edges representing the track, and
   updating the track based on the at least one second type edge.

19. The method according to claim 14, wherein the set of connected first type edges define a feasible solution in the graph, and the at least one second type edge adds additional long range information to an objective on which nodes should be joint or cut without modifying the feasible solution.

20. The method according to claim 14, wherein the first type edges define possibilities of joining nodes directly into the same track and the second type edges do not define possibilities of directly joining nodes.

* * * * *